Figure 1:
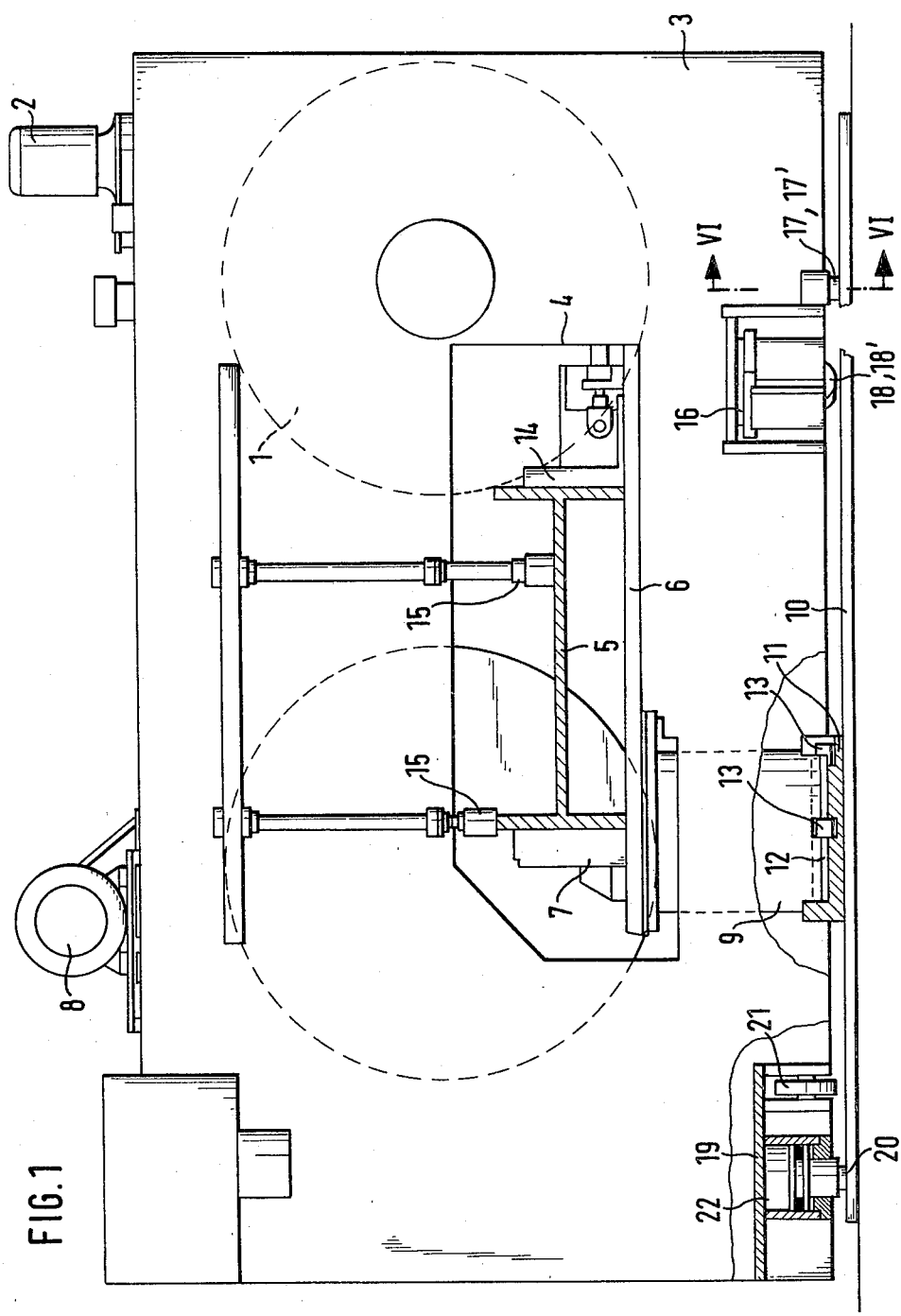

United States Patent [19]

Stursberg et al.

[11] 4,338,838

[45] Jul. 13, 1982

[54] APPARATUS FOR SLITTING WORKPIECES

[75] Inventors: Bernd Stursberg, Ennepetal; Ludwig Regenbrecht, Gevelsberg, both of Fed. Rep. of Germany

[73] Assignee: Rolf Peddinghaus, Ennepetal, Fed. Rep. of Germany

[21] Appl. No.: 213,197

[22] Filed: Dec. 4, 1980

[30] Foreign Application Priority Data

Dec. 11, 1979 [DE] Fed. Rep. of Germany ....... 2949674

[51] Int. Cl.³ .......................................... B23D 47/02
[52] U.S. Cl. .................................. 83/467 R; 83/466; 83/471.3; 83/488; 83/564; 83/648
[58] Field of Search ................. 83/467 R, 157, 471.3, 83/471.2, 488, 648, 859, 564, 466

[56] References Cited

U.S. PATENT DOCUMENTS 2,171,541  9/1939  Grouch ............................ 83/488 X 3,919,908  11/1975  Jaegers ............................. 83/471.2

*Primary Examiner*—James M. Meister
*Attorney, Agent, or Firm*—Holman & Stern

[57] ABSTRACT

An apparatus for slitting workpieces has a machine frame which includes a work support, a workpiece stop and a rotary saw which is slidable in the frame. The frame is supported on feet, at least two of which are positioned on a line parallel to the feed path of a workpiece into the apparatus. Another of the feet can be hydraulically withdrawn to allow the machine frame to tilt about an axis defined by engagement of the aforesaid two feet with a bedplate, and thereby to bring the work support and the lower part of the workpiece stop below the workpiece feed path, so that a workpiece may be advanced unobstructed into the apparatus. The apparatus is tilted back to its working position after the workpiece is in its desired position.

11 Claims, 6 Drawing Figures

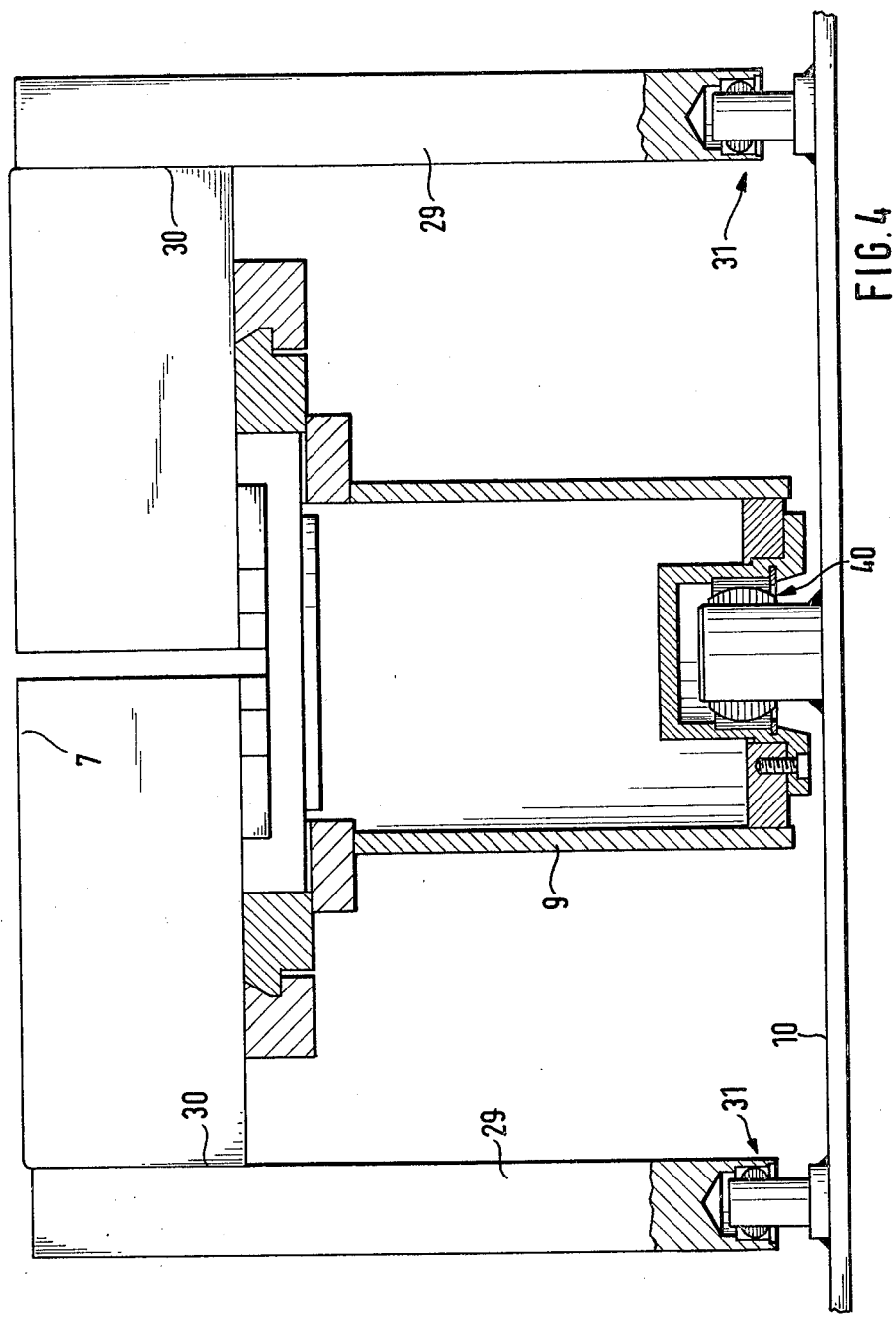

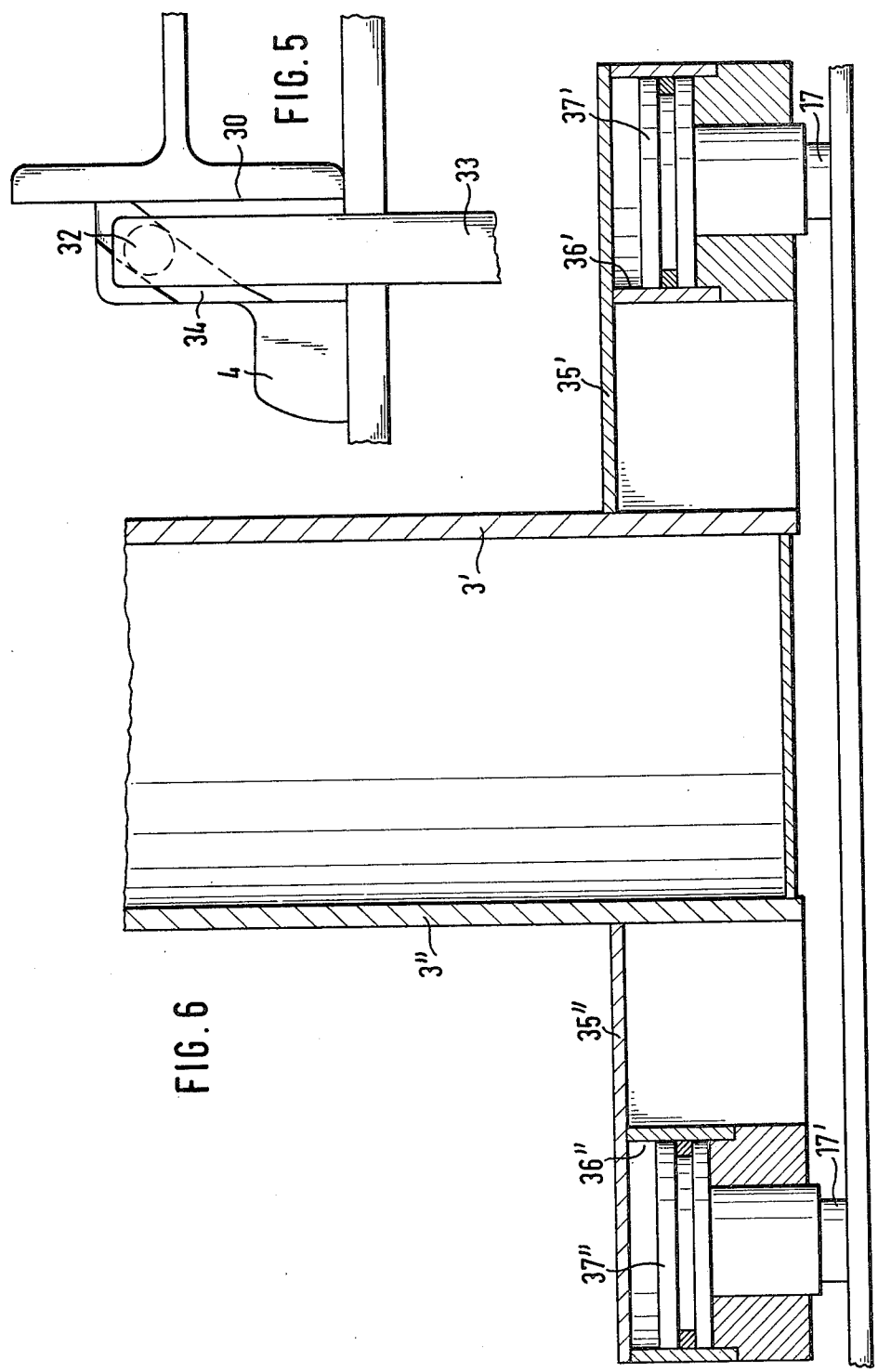

APPARATUS FOR SLITTING WORKPIECES

This invention relates to apparatus for slitting workpieces, of the kind having a machine frame for receiving and supporting a workpiece, a saw blade mounted on the frame for sliding movement to engage a workpiece, and a workpiece stop which is of split configuration to permit entry of the saw blade and is mounted so as to be non-rotatable in the plane of a feedpath of the workpiece into the frame.

A metal slitting saw of this kind is known from German Gebrauchsmuster No. 18 10 599. In that arrangement the blade of a circular saw mounted in vertical guides is adapted to be lowered between the split workpiece stop and a cocking stop to execute a predetermined cut. In raised position it leaves a clear space between cocking stop and workpiece end stop thus allowing the workpiece to be conveyed in the longitudinal direction across the work-support table.

For cutting wider workpieces in a metal slitting saw of the kind specified, the saw blade is, as a general rule, mounted on a slide which is slidable in the horizontal direction, for instance according to German Patent Specification No. 494 162.

If a slitting apparatus of the kind specified is to be arranged in a production or conveyor track wherein for example roller tables feed and discharge the work pieces at a predetermined vertical level, it may happen for various reasons that the leading edge of the workpiece on approach hits against the edges presented by the work support table and by the work-piece stop so that the position of the workpiece is altered or further conveying becomes totally impossible. This can be critical, particularly where the workpieces are longitudinally advanced by a feed device with slip-sensitive work-gripping means, and it would then be difficult to maintain work feed to specification. This kind of feed problem would arise, for example, with a roll feed according to German Pat. No. 1777105.

In as much as there is a risk of the work piece hitting the work support table as well as the workpiece stop, those earlier proposals which, for example, provided for the leading rollers of a roller table or like conveyor device to be adapted to be raised or lowered, cannot remedy the situation because despite their provision the vertical edge of the workpiece stop could still be in the conveying path.

Starting with this state of the art the present invention has for its aim to construct a slitting apparatus of the kind specified in such a way that it can be readily incorporated in a production or conveying track for longitudinally advancing workpieces without presenting any problems in respect of the leading workpiece edges hitting against obstructing parts as hereinbefore described.

This aim is realised by the provisions according to claim 1 further developed by the provisions set out in claims 2 to 9.

Accordingly the invention resides in principles in that the entire machine frame including the workpiece stop supported thereon is brought into a tilted position. This achieves by a single adjusting movement not only that the workpiece support table occupies a position beneath the conveying plane but also that this applies equally to at least the lower part of the workpiece stop. Since even very small deviations from the working position suffice to ensure unobstructed workpiece passage very little effort is needed to transfer the metal slitting saw from its working position into its pass position and vice versa. Moreover, the means for tilting the whole slitting apparatus is also quite inexpensive because in the simplest, and at the same time preferred, arrangement these means may consist of just three supporting feet of which only one need be adjustable in the vertical direction. Since, as a rule, the adjustment is made by means of hydraulic cylinders it will generally even be possible to dispense with special bearings for these supporting feet.

In the case of the further developed arrangement a functional adaptation to cutting operations on the one hand and to workpiece conveying on the other may be achieved, by arranging for the machine frame to occupy a tilted position in the conveying phase, in which position it can, above all, also be pivoted by means of rollers to allow adjustment to a desired mitre angle. When this adjustment operation is completed the machine frame can be returned from the tilted position to a normal working position in which latter the supporting feet are functional.

This arrangement has the advantage of meeting the indispensible requirement for fixability of the machine frame because when resting on the feet the machine frame is fixed relative to the supporting base.

Special attention must be devoted to the way in which the tilting of the machine frame affects the workpiece stop which in its turn, as specified in claim 1, is supported by the machine frame but is not rotatable in the workpiece feed plane. Basically, therefore, the arrangement is such that the workpiece stop has its own vertically adjustable connection with a bed plate by means of a pillar. Such vertical adjustability relative to the bedplate of the machine is an essential condition for enabling the workpiece stop to be tilted jointly with the machine frame. In principle this kind of connection may be executed in such a way that, whilst preserving the non-rotatable mounting of the workpiece stop or its pillar, it permits tilting about the tilting line, that is to say about a line which is substantially parallel to the direction of work feed, on one side of the workpiece feed path. Preferably, however, special means are provided for effecting this pivotal displacement of the workpiece stop or its pillar.

Thus, according to a further proposal of this invention, the pillar may comprise a three-dimensional or spatial joint which permits tilting. This spatial joint may be obtained in a very simple way by providing two vertically spaced mutually perpendicularly aligned adjusting spring couplings. Such adjusting spring couplings afford vertical adjustability whilst making all rotational movement impossible.

Arrangements of the above described kind however involve constructional provisions below the workpiece stop for which in many cases no space is available. For situations of this type a particular embodiment of the invention provides a solution according to which a connection to the bed plate in spaced relation both with the workpiece stop and also with the machine frame is made possible by anchoring torsion elements at a corresponding distance. This is not confined to torsion elements extending from the lower part of the pillar but can also be realised if the torsion elements extend from the upper part of the pillar and further uprights are provided.

Figure 2:
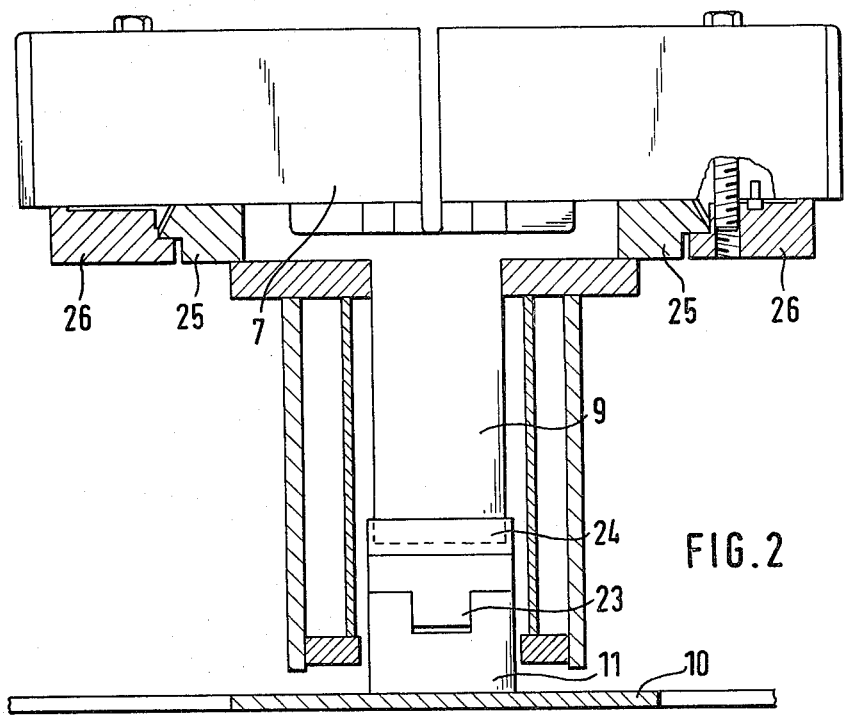
Figure 3:
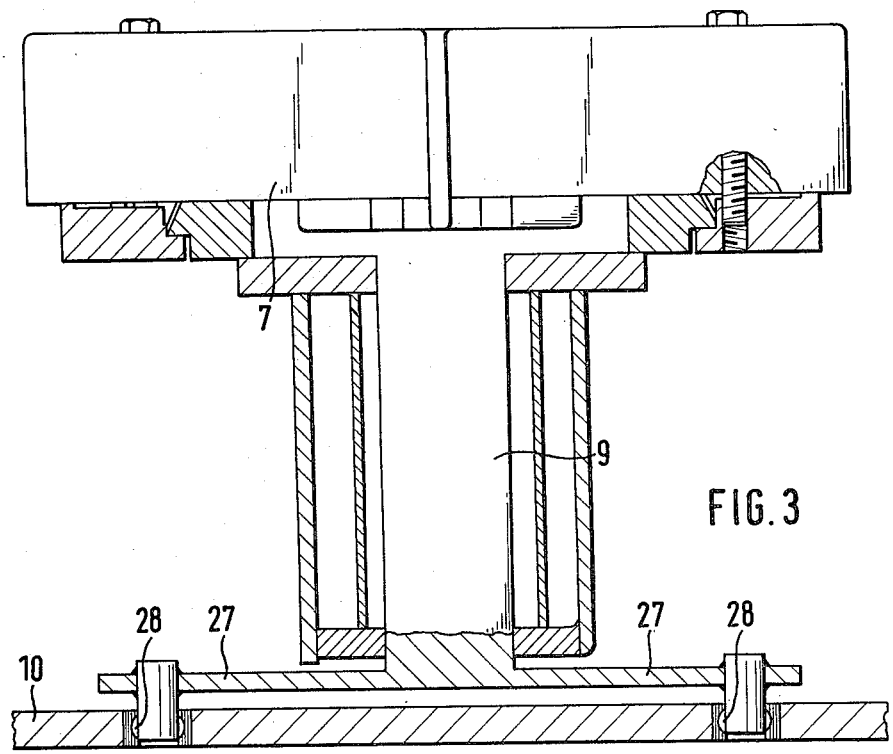

In an alternative arrangement stands with guide bolts may be arranged in the direct vicinity of the workpiece stop. This arrangement may often be preferred in view of available space conditions The invention is more particularly explained with reference to embodiments shown by way of example in the accompanying drawings wherein, in each case in schematic representation, FIG. 1 is an end view of the entry side of the new metal slitting saw, FIG. 2 is a view taken at right angles to FIG. 1 corresponding to a vertical section line, with a work stop pillar which is adapted to be disengaged by means of two adjusting spring couplings, FIG. 3 is a view corresponding to FIG. 2, but with lower torque-absorbing elements, FIG. 4 is a view corresponding to FIG. 2, but with torque-absorbing elements which are applied at the top, and FIG. 5 is a view directed at arcuate guides provided on vertical faces of the end stop.

FIG. 6 is an enlarged top view of a section taken on line IV–IV' in FIG. 1.

FIG. 1 shows the sawblade 1 in dotted outlines in its starting position and in full drawn, or continuous outline in an operative or working position thereof. It is connected through a gear box to a motor 8 and displaceable in the horizontal direction by means of a slide, not shown, and a spindle, which is driven by a motor 2. A machine frame 3 has a passage aperture 4 for a workpiece 5, one of which is shown in the form of a double T-section. This rests on a workpiece support table 6, its left hand edge touching a workpiece stop 7. The latter is split to allow the saw-blade 1 to pass through and is supported by the machine frame 3 in such a way that a pillar 9, which is shown in the middle region of the machine frame 3 and is represented in broken lines, is slightly vertically slidable relative to a socket 11 which is anchored in a bed plate 10 of the machine. A gap 12 between the juxtaposed end faces of the two parts 9, 11 is clearly visible in the drawing. The pillar 9 and the work stop 7 are rotationally rigidly retained in blocking guide ways 13 of which four in all are provided. At the work stop 7 the workpiece 5 is further held fast by means of a cocking or tensioning stop 14 therebeneath whilst being held on the work support table 6 by means of two upper hydraulic clamping rams 15.

On the right hand side of the track provided for the feed of workpiece 5 the drawing shows one of two substantially horizontal legs 16 arranged on both sides of the machine frame 3 which is provided with a foot support 17 and which a runner roller 18. A corresponding support 17' and roller 18' is provided on the opposite side of machine frame 3. As shown in the drawing the foot supports 17, 17' rest on the bed plate 10 whereas the rollers 18, 18' are slightly spaced above the bedplate 10. On the left hand side of the work feed track the drawing also reveals a foot support 20 associated with a central leg 19 which supports the machine frame relative to the bed plate 10. A roller 21 which is here also provided, is spaced further away from the bed plate plane than the rollers 18, 18'. The machine frame occupies the position shown in the drawing in the course of an actual cutting pass of the saw. The frame 3 is held in this position by the foot supports 17, 17' and 20. The work stop 7 is then also immobilised relative to the machine frame by means of clamping claws which will be hereinafter more particularly described.

When a new workpiece is fed to the machine the foot support 20 is raised by an associated hydraulic ram 22. The roller 21 is progressively lowered causing the whole machine frame first of all to tilt about a line which passes through the two foot supports 17, 17' and which is parallel to the work feed path. On further descent the rollers 18, 18' make contact with the bedplate 10 so that thereafter further support is provided along a tilting line defined by the two last mentioned rollers. Eventually roller 21 also touches the bedplate 10 whereupon the machine frame 3, having previously been released from the locking engagement with the work stop 7, can be horizontally pivoted as a whole and then locked fast in its new position, especially after the new workpiece has been introduced into the work-receiving aperture. For locking the foot support 20 is extended and the foregoing operations follow each other in reverse order.

FIG. 2 is a view, which is offset through 90°, of the work stop 7. The piller 9 provides a connection to the socket 11 which is mounted in the bedplate 10. This connection can be disengaged or uncoupled, by means of a universal joint comprising two vertically spaced mutually perpendicularly aligned adjusting spring couplings 23 and 24. Thus the pillar 9 and the workstop 7 connected therewith may follow the tilting movement of the machine frame. The drawing also shows bars or webs 25 of the machine frame 3 on both sides of the pillar 9, relative to which webs 25 the work stop 7 can be immobilised after adjustment by means of clamping claws or straps 26.

In the embodiment according to FIG. 3 torsion members 27 are attached to the foot of pillar 9 and their other ends are secured by means of spatial joints 28 to the bed plate 10, the whole being adapted to be lowered in the vertical direction. It will be readily appreciated that the required tilting movement of pillar 9 with end stop 7 carried thereon may also be assured by suitable adaptation of the torsion members 27 for torsion and bending.

Alternatively, as shown in FIG. 4, the above mentioned torque absorbing members 27 may be provided in the form of uprights 29 connected to vertical end surfaces 30 of workstop 7 and in their turn anchored by spatial joints 31 in the bed plate 10. In order to be able also to follow a corresponding tilting movement the pillar 9 is also connected to the bedplate by means of a spatial joint 40.

Finally, as shown in FIG. 5, it is possible to provide the above mentioned vertical end surfaces 30 of the workstop 7 with arcuate guide grooves 34. Guide bolts 32 engage the grooves 34 and are secured to pillars 33 fixed on the bed plate 10. Each of the grooves 34 is comprised of two arcs, which are respectively centred on the tilt axis defined by the foot supports 17, 17' and on the tilt axis defined by the rollers 18, 18', and the two arcs in each groove 34 are positioned so that the workstop 7 can move freely about the tilt axis which is, for the time being in use. The stop 7 is thus constrained to move in a defined manner about the tilt axes.

It may further be advisable, in order to assure unobstructed work passage through the machine, to make not only the foot support 20 but also the foot supports 17, 17' adjustable for a specified vertical position common to all supports. This is shown on a larger scale in FIG. 6. The drawing shows the front wall 3' and the rear wall 3" of the machine frame 3 with forwardly and rearwardly directed extensions 35' and 35". Each of these two extensions receives one foot support, the latter being indicated by references 17, 17', corresponding to FIG. 1. Each foot support is associated with an hydraulic cylinder 36', 36" comprising the suitably sealed pistons 37', 37". By admission of hydraulic fluid into cylinders 36', 36" the rams 37', 37" are displaced in the vertical direction so that the associated foot supports 17, 17" can be adjusted to the correct height as envisaged.

The above described additional height adjustment facility for the supports 17 and 17' will be conveniently adopted primarily where elastic components are used in the construction as a whole, as for example, where torsion members are provided, which could become wedged in the event of excessively steep inclination of the machine frame.

We claim:

1. An apparatus for slitting workpieces, comprising a machine frame have a sawblade slidably mounted thereon, said frame including means for receiving a workpiece which can be fed in a path transversely of the direction of sliding movement of said sawblade, said frame also including a work support and a stop for locating a workpiece, said stop being non-rotatable in a plane in which said workpiece is fed, and being of split configuration to permit said sawblade to pass through, said machine frame having two foot elements located on a line substantially parallel to said workpiece feed path and to one side of said path, and a third foot elements located on the opposite side of said work feed path, said foot elements being engageable with a supporting bed, and means for adjusting the height of said third foot element with respect to that of said two foot elements, to tilt said frame about a tilt axis substantially parallel to said work feed path, and thereby to lower said work support relative to said feed path.

2. An apparatus as claimed in claim 1 which includes roller devices adjacent respective ones of said foot elements, said roller devices being mounted on said machine frame so as to be engageable with said supporting bed as a result of tilting movement of said frame.

3. An apparatus as claimed in claim 2 in which the roller devices adjacent said two foot elements are closer to said work feed path than said two foot elements.

4. An apparatus as claimed in claim 1 which includes means for vertically adjustably mounting said workpiece stop on said supporting bed.

5. An apparatus as claimed in claim 4 in which said means for mounting said stop includes means for permitting movement of said stop about said tilt axis.

6. An apparatus as claimed in claim 5 in which said means for permitting movement of said stop is a universal joint.

7. An apparatus as claimed in claim 4 in which the means for mounting said workpiece stop comprises a pillar, torsion members secured to said pillar and extending therefrom, and means for connecting said torsion members to said supporting bed.

8. An apparatus as claimed in claim 7 in which said torsion members extend from said pillar in directions substantially parallel to said workpiece feed path.

9. An apparatus as claimed in claim 7 in which said torsion members extend downwardly from the upper part of a structure provided by said pillar and said workpiece.

10. An apparatus as claimed in claim 1 in which said stop is provided with arcuate guideways which are centred on said tilt axis, and which includes means for mounting on said supporting bed and for slidably engaging said guideways.

11. An apparatus as claimed in claim 1 which includes means for adjusting the heights of all of said foot elements to equal amounts.

* * * * *